United States Patent [19]
Chow et al.

[11] Patent Number: 5,187,000
[45] Date of Patent: Feb. 16, 1993

[54] CELLULOSIC CONSTRUCTION PANEL

[75] Inventors: Suezone Chow, Richmond; David H. Dawes, Westbrook, both of Canada

[73] Assignee: Canadian Forest Products Limited, Vancouver, Canada

[21] Appl. No.: 611,577

[22] Filed: Nov. 13, 1990

[30] Foreign Application Priority Data

Nov. 15, 1989 [GB] United Kingdom ............... 8925813

[51] Int. Cl.⁵ .................. B32B 21/04; B32B 27/10
[52] U.S. Cl. ................................ 428/141; 428/513; 428/514; 428/516; 428/910
[58] Field of Search .............. 428/141, 513, 516, 514, 428/910

[56] References Cited

U.S. PATENT DOCUMENTS

| | | | |
|---|---|---|---|
| 3,215,556 | 11/1965 | Kehr | 428/513 |
| 3,817,822 | 6/1974 | Dawes | 428/513 |
| 4,020,215 | 4/1977 | Michaylov | 428/513 |
| 4,195,109 | 3/1980 | Long | 428/513 |

FOREIGN PATENT DOCUMENTS

| | | |
|---|---|---|
| 57-176152 | 10/1982 | Japan . |
| 59-202849 | 5/1983 | Japan . |
| 1477658 | 6/1977 | United Kingdom . |
| 1577905 | 11/1980 | United Kingdom . |

*Primary Examiner*—P. C. Sluby
*Attorney, Agent, or Firm*—Richard H. Burgess

[57] ABSTRACT

A panel, especially a construction panel, formed from a substantially inflexible cellulosic substrate having a rough or uneven surface is disclosed. The substrate is coated with a layer of a grafted polyolefin and a layer of kraft paper or veneer. The polyolefin is a homopolymer of ethylene or copolymer of ethylene and at least one $C_4$-$C_{10}$ hydrocarbon alpha-olefin having a melt index of less than 20 dg/min that has been grafted with at least 9 ppm of an ethylenically unsaturated carboxylic acid or anhydride. One-step and multi-step processes for the manufacture of the panels are disclosed. The panels may be painted or coated by other means, and are useful in the construction industry, especially for interior surfaces of buildings. The panels may be formed from cellulosic substrates that may not otherwise be useful for the end-uses of the panels.

5 Claims, No Drawings

CELLULOSIC CONSTRUCTION PANEL

The present invention relates to a panel, especially a construction panel, formed from a substantially inflexible planar cellulosic substrate, at least one layer of paper or veneer, and an interposed layer of a grafted polyolefin. In particular, the panel is formed from a substrate that is obtained from particles or flakes or other wood fragments.

In the construction of houses and other buildings, it is known to use a variety of types of construction panels for walls, flooring and other surfaces. While it may be preferred to use solid wood boards of hardwood or softwood for such surfaces, solid boards are becoming more and more expensive. An alternative is to use veneer panels for wall surfaces, but as trees of the required type, size and quality become more and more scarce, the manufacture of multilayer veneers or plywoods is becoming both more expensive and veneer panels are more difficult to obtain in a high quality.

It is also known to use gypsum boards or similar panels that are formed from two outer layers of paper material having an inorganic material e.g. gypsum or calcium sulphate, between the layers of paper material. Gypsum board suffers from substantial loss of strength and/or structural integrity if the board becomes wet. Moreover, it is difficult to insert nails, screws or the like into gypsum board to attach decorative articles e.g. paintings, photographs and ornaments, especially if the articles are heavy.

As a result of the need to maintain the costs of construction as reasonable as is practical while still producing buildings of acceptably high quality, efforts have been made to use construction materials that are more economical. For instance, particle board, fibre board, oriented strand board (OSB), hardboard, other similar boards formed from wood that may not otherwise be usable in the construction industry and boards formed from particles, chips, flakes or other fragments of wood, are being used more and more frequently in the construction of buildings, particularly for wall and floor surfaces and sub-surfaces. Such boards have a quality and integrity that is more than adequate for such use. However, they are often characterized, depending on the particular type and method of construction of the board, by uneven and rough surfaces e.g. OSB has uneven surfaces with indentations that are frequently more than one millimeter in depth. In addition, some such boards also suffer from deficiencies relating to swelling of the boards on exposure to moisture or liquid water; the boards may be coated with wax or otherwise treated in attempts to overcome such a deficiency.

U.S. Pat. No. 4,241,133 of A.E. Lund et al, issued Dec. 23, 1980, discloses that wood flakes may be bonded together with a binder. Examples of the binders include urea/formaldehyde resins, phenol/formaldehyde resins, melamine/formaldehyde resins and polyisocyanates. Binder concentrations of between 5 and 12% are disclosed. Waxes may be used for water resistance and preservatives may also be added. Other methods of manufacture of particle and similar boards are disclosed in U.S. Pat. Nos. 3,164,511 of A. Elmendorf, issued Jan. 5, 1965, 3,391,233 of B. Polovtseff, issued Jul. 2, 1968, and 3,940,230 of E. Potter, issued Feb. 24, 1976.

Panels formed from a layer of solid polyolefin bonded on one side to a wooden substrate and the use of such panels as concrete form boards are disclosed in Canadian Patent 918 896 of J. P. Van den Steen, issued Jan. 16, 1973, and in Canadian Patent 931 486 of D. H. Dawes and J. P. Van den Steen, issued Aug. 7, 1973. Concrete form boards are also disclosed in published Japanese patent application No. 62 244 961 of Showa Denko, published Oct. 26, 1987. Such concrete form boards are formed from a wooden panel coated with a modified olefinic polymer layer e.g. polypropylene, polyethylene or their copolymers grafted with an unsaturated carboxylic acid or derivatives thereof, acrylic acid and methacrylic acid being disclosed.

U.S. Pat. Nos. 4,487,885 of A. M. Adur et al, issued Dec. 11, 1984 4,460,632 of A. M. Adur et al, issued Jul. 17, 1984 and 4,477,532 of S. Schmukler et al, issued Oct. 16, 1984, and Canadian Patent No. 1 083 291 of M. Shida et al, issued Aug. 5, 1980, all relate to composite structures that are formed using grafted homopolymers or copolymers of ethylene. Use of the grafted polymers as adhesives in the bonding of wood, especially to polymeric substrates, is disclosed.

A wooden molding material is disclosed in published Japanese application No. 59 202 849 of Otsuka Kagu Kogyo, published Nov. 16, 1984. The material is obtained by bonding a natural wood decorated substrate with plastic sheet or substrate whose one side is coated with a thermoplastic polymer adhesive e.g. polyvinylchloride, polyvinyl chloride/vinyl acetate copolymers or bonded with an adhesive-impregnated paper. Laminates of substrates with fibrous material using an adhesive comprised of a polyolefin modified with an unsaturated carboxylic acid are disclosed in published Japanese application No. 57 176 152 of Idemitsu Kosan, published Oct. 29, 1982. The substrates include metals, polymers, ceramics and wood.

Resin-impregnated paper overlays are also known. In so-called high density overlays, paper containing partially cured phenol-formaldehyde resin is bonded to a wooden substrate using heat and pressure, with a release agent being required to prevent sticking to the heating plates during manufacture. In so-called medium density overlays, paper impregnated with cured phenol-formaldehyde resin is bonded to a wooden substrate using a partially cured resin. The time of pressing is typically in the range of about 5 to 9 minutes, depending on the type of overlay being manufactured. The overlays are used as concrete form boards, with the medium density overlays also being capable of being coated or painted.

It has now been found that a construction panel useful in the building industry, and especially for interior surfaces of buildings, may be formed from a substantially inflexible cellulosic substrate having a rough or uneven surface and at least one layer of paper or veneer, with an interposing layer of a grafted polyolefin.

Accordingly, the present invention provides a panel consisting essentially of:
 a) a planar substantially inflexible cellulosic substrate having a rough or uneven surface; and
 b) at least one layer of paper or veneer;
 c) said surface and said layer of paper or veneer being bonded to an interposed layer of a polyolefin selected from the group consisting of homopolymers of ethylene and copolymers of ethylene and at least one $C_4$–$C_{10}$ hydrocarbon alpha-olefin, and mixtures thereof, and having a melt index of less than 20 dg/min, said polyolefin having been grafted with at least 9 ppm by weight of an ethylenically unsaturated carboxylic acid or anhydride.

In a preferred embodiment of the panel of the present invention, the layer of paper or veneer is kraft paper.

The present invention also provides a process for the manufacture of a panel consisting essentially of:
a) a planar substantially inflexible cellulosic substrate having a rough or uneven surface; and
b) at least one layer of paper or veneer;
c) said surface and said layer of paper or veneer being bonded to an interposed layer of a polyolefin selected from the group consisting of homopolymers of ethylene and copolymers of ethylene and at least one $C_4$–$C_{10}$ hydrocarbon alpha-olefin, and mixtures thereof, and having a melt index of less than 20 dg/min, said polyolefin having been grafted with at least 9 ppm by weight of an ethylenically unsaturated carboxylic acid or anhydride; said process comprising contacting said surface of the cellulosic substrate and said layer of paper or veneer with a layer of said polyolefin, said layer of polyolefin being interposed between the cellulosic substrate and the layer of paper and veneer, heating the resultant sandwich of layers to a temperature of at least 130° C. under pressure for a period of at least 60 seconds to effect bonding of the polyolefin to the cellulosic substrate and to the paper or veneer, removing and cooling the panel so formed.

In an embodiment, the process is a continuous process.

The present invention further provides a process for the manufacture of a panel consisting essentially of:
a) a planar substantially inflexible cellulosic substrate a rough or uneven surface; and
b) at least one layer of paper or veneer;
c) said surface and said layer of paper or veneer being bonded to an interposed layer of a polyolefin selected from the group consisting of homopolymers of ethylene and copolymers of ethylene and at least one $C_4$–$C_{10}$ hydrocarbon alpha-olefin, and mixtures thereof, and having a melt index of less than 20 dg/min, said polyolefin having been grafted with at least 9 ppm by weight of an ethylenically unsaturated carboxylic acid or anhydride; said process comprising feeding cellulosic fragments to conveying means, said conveying means being planar and said fragments being coated with a binder resin in an amount adapted to effect bonding of the fragments together under the influence of heat and pressure to form said cellulosic substrate, feeding a layer of said polyolefin onto the layer of fragments and a layer of paper or veneer onto the layer of said polyolefin, passing the resultant sandwich of layers to heating and pressure means and heating the sandwich to a temperature of at least 130° C. under pressure for a period of at least 60 seconds to effect bonding of the polyolefin to the cellulosic substrate and to the paper or veneer, and cooling the panel so formed.

In a preferred embodiment of the processes of the present invention, the layer of polyolefin is in the form of a film.

In another embodiment, the layer of polyolefin is a coating on the layer of paper or veneer.

The present invention relates to a panel formed from a cellulosic substrate and paper or veneer, with an interposed layer of a grafted polyolefin.

The panel of the present invention will be generally described herein with reference to a construction panel.

The substrate is a substantially inflexible cellulosic substrate i.e. it will have structural integrity, be capable of being flexed to only a minor degree and be formed from a wood product. The cellulosic substrate may have been derived from particles, chips, flakes, sawdust, paper and/or other fragments of wood. The fragments of wood may be derived from a variety of trees, including both hardwood and softwood trees. Examples of such trees include, but are not limited to, aspen, beech, birch, cedar, Douglas and other firs, hemlock, pine and spruce in Canada, but in other countries could be exemplified by other types of trees used or potentially usable in the construction industry. The actual form of the cellulosic substrate may be varied widely; as used herein, "planar substantially inflexible cellulosic substrate" is understood to include particleboard, OSB, waferboard, plywood, fibreboard, hardboard, chipboard and the like. The wood product is described herein as having an uneven or rough surface, and the wood products described above generally are formed with such a surface. Such surfaces are normally not capable of being coated, especially painted, to provide a high quality smooth and/or an attractive outer surface.

Techniques for the manufacture of the substrates are known in the art. For instance, the substrates may be obtained from wood fragments using a press. A bonding agent is normally applied to the surface of the wood fragments, examples of such bonding agents being urea/formaldehyde resin, phenol/formaldehyde resin, melamine/formaldehyde resin polymeric isocyanate resin and the like. The bonding agent, which is preferably in a powder form rather than a liquid form and is preferably a phenol/formaldehyde resin, is typically applied in amounts in the range of 1.8 to 2.3%, on a weight basis, of wood fragments. In addition, a wax e.g. a petroleum wax, may also be applied to the wood fragments, typically in amounts in the range of 1-2%, on a weight basis, of wood fragments, to improve water resistant properties. Preservatives and other additives may also be applied to the wood fragments, as is known.

The outer layer of the construction panel is formed from paper or veneer. A wide variety of papers may be used, but it is preferred that the paper be a kraft paper. The kraft may be bleached kraft paper, but is preferably unbleached kraft paper. The paper may be used in a variety of thicknesses, depending in particular on the thicknesses of paper that are commercially available. In addition, the particular process of manufacture of the construction panels of the invention, including the nature of the wood fragments used in that process, may be factors in the selection of the thickness of the paper, as some processes may impose higher demands on strength properties of the paper in order to resist puncture during manufacture. Preferred thicknesses of kraft paper are 3 and 6 mils i.e. 75 and 150 microns respectively.

Alternatively, the outer layer of the construction panel may be a veneer i.e. a thin layer of wood covering the surface of the construction panel. Methods for the manufacture of veneers are known, and may be obtained from a variety of types of trees. Examples of such trees include birch, Japanese cypress and yellow cedar, but other trees may be usable.

The polyolefin of the interlayer may be a homopolymer of ethylene or a copolymer of ethylene with at least one $C_4$–$C_{10}$ hydrocarbon alpha-olefin, or mixtures thereof. The preferred copolymers are copolymers of ethylene with butene-1, hexene-1 and/or octene-1. The density of the polymers may be varied over a wide range e.g. in the range of from about 0.890 g/cm³ to about 0.970 g/cm³. The melt index of the polymer, as measured by the procedure of ASTM D-1238 (Condition E, also known as 190/2.16) is less than 20 dg/min. If the polymer is used in the form of a film, as discussed herein, the polymer preferably has a density in the range of 0.905 to 0.940 g/cm³, with the melt index preferably being in the range of 0.35-5.5 dg/min, especially 0.60-2.5 dg/min. If the polymer is used in the form of a coating, as discussed herein, the polymer preferably has a density in the range of 0.915 to 0.925 g/cm³, with the melt index preferably being in the range of 2-20 dg/min, especially 5-15 dg/min. In alternative embodiments, the polyolefin that is grafted is a copolymer of ethylene with vinyl acetate, acrylic or methacrylic acid, carbon monoxide or alkyl esters of acrylic and methacrylic acid, and mixtures thereof.

The monomer that is grafted onto the polyolefin is an ethylenically unsaturated carboxylic acid or derivative thereof. The grafting monomer is selected from the group consisting of ethylenically unsaturated carboxylic acids and ethylenically unsaturated carboxylic acid anhydrides, including derivatives of such acids. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride and substituted maleic anhydride e.g. dimethyl maleic anhydride, nadic anhydride, nadic methyl anhydride and tetrahydro phthalic anhydride. Examples of derivatives of the unsaturated acids are salts, amides, imides and esters e.g. mono- and disodium maleate, acrylamide, maleimide, glycidyl methacrylate and diethyl fumarate.

The amount of grafted monomer of the polyolefin may also be varied over a wide range, but should be at least 9 ppm by weight of the polyolefin. In embodiments, the amount of grafted monomer may be as high as 5% by weight, especially 0.01-0.2% by weight and in particular in the range of 0.02-0.15% by weight. Grafted polyolefins are available commercially e.g. under the trademark Fusabond from Du Pont Canada Inc. In addition, methods for the grafting of monomers onto polyolefins are disclosed in U.S. Pat. No. 4,612,155 of R. A. Zelonka and C. S. Wong, issued Sep. 16, 1986. The amount of graft monomer in the polyolefin used according to the present invention may be obtained by grafting the required amount onto the polyolefin or by blending a polymer having a higher level of graft monomer with un-grafted polyolefin or polyolefin with a low level of graft monomer. In alternative embodiments, the graft polyolefin may be replaced with an acid copolymer e.g. a copolymer of ethylene and an unsaturated carboxylic acid, examples of which are ethylene/acrylic acid and ethylene/methacrylic acid copolymers, or with ionomers of such copolymers. Examples of both the acid copolymers and ionomers are commercially available.

The construction panels of the invention may be manufactured using a variety of methods. For instance, the cellulosic substrate may be extrusion coated with the grafted polyolefin and then the layer of paper or veneer applied on top. The resulting sandwich of layers is then heated, preferably under pressure in a press or between rolls, to effect bonding of the interposed layer of grafted polyolefin to the cellulosic substrate and the paper or veneer. The grafted polyolefin layer is heated to a temperature above the melting point of the grafted polyolefin in order to effect bonding i.e. to a temperature in excess of 130° C. and especially in the range of about 150° to 200° C.

Alternatively, the paper or veneer may be extrusion coated with the grafted polyolefin. The coated paper or veneer would then be contacted with the cellulosic substrate, and subjected to heat and pressure to effect bonding, as discussed above.

In a further embodiment, the cellulosic substrate, a film of the grafted polyolefin and the layer of paper or veneer are brought into contact and subjected to heat and pressure to effect bonding.

In an alternative method, the panels may be manufactured in a one-step process. In such a process, a layer of paper is fed onto a screen or other support surface. A layer of the polyolefin film is then fed on top of the paper, it being understood that the layer of paper may actually have the layer of polyolefin film coated thereon. A layer of wafers or other fragments of wood is then laid onto the polyolefin film, in an amount to provide a substrate of the required thickness. The wafers would normally be coated or admixed with a binder e.g. a phenol/formaldehyde resin. A second polyolefin film and a second layer of paper may then optionally be fed onto the wafers. The resultant assembly of layers is then fed between heated rollers that heat the assembly, under pressure, to a temperature sufficient to effect bonding of the layers to the extent that a panel is formed. Such a one-step process may be operated in a continuous manner.

The construction panels of the invention may be used in a variety of end-uses, depending in particular on the nature of the panel. For instance, the panels may be used as the interior surfaces of buildings. Panels coated with paper may be painted to provide an attractive surface, the layer of paper providing a surface that is capable of being painted while the interposed layer of grafted polyolefin provides a smooth surface that tends to cover defects e.g. roughness or unevenness, in the surface of the cellulosic substrate. The layer of paper may also be decorated in other manners. Panels coated with veneer may be shellacked or coated with varnish or the like, to preserve and enhance the attractive features of the veneer. The panels may be nailed and are capable of accepting paintings and other wall decorations. The panels may also be used as sub-layers in the construction industry, to provide barriers to moisture or the like and to provide a surface that is capable of having other layers adhered thereto.

The invention is illustrated by the embodiments in the following examples:

EXAMPLE I

Samples of unsanded and sanded OSB measuring 12.5×12.5 cm were overlaid with (i) polyethylene film having a thickness of about 25-32 microns, (ii) polyethylene film that had been formed from polyethylene that had been blended with between 3 and 10% of a grafted polyolefin containing 0.9% by weight of grafted maleic anhydride, and having a thickness of about 25-32 microns, and (iii) films corresponding to the films of (ii) in which the polyethylene had been reinforced with 10% sanderdust, such films having a thickness of about 635 microns. Kraft paper having a thickness of 75 microns or white bond paper having a thickness of 90 microns was placed on top of the polyethylene film.

Each of the resultant sandwiches of cellulosic substrate, polyolefin and paper were pressed for 1-2 minutes on a 15×15 cm Carver hot press using platen temperatures of either 150° C. or 200° C., and pressures of 200 psi (1.38 MPa). The pressed samples were rolled with a metal tube immediately after being removed from the press, in order to remove any bubbles that might have formed in the pressed sample. It was noted that less bubbles were formed when the samples were pressed at 150° C. than at 200° C.

Samples of the resultant panels made with polyethylene film ((i) above), unreinforced polyethylene film formed from grafted polyolefin containing 0.045% grafted monomer and 10% sanderdust reinforced polyethylene film formed using grafted polyolefin containing about 0.063% grafted monomer were tested for delamination using the following procedure: The samples were immersed in boiling water for a period of 5 hours, cooled in water at ambient temperature for a further 1 hour and subsequently dried in an oven at 60° C. for 18 hours. It was found that the samples formed with grafted polymers showed better adhesion of the wood and the paper than the corresponding samples with the ungrafted polymer.

Specimens of the panels having a width of 2.5 cm were cut and subjected to a vacuum-pressure treatment which consisted of submerging the specimens in cold tap water in a vacuum pressure tank, drawing a vacuum of 62.5 cm of mercury for 30 minutes and subsequently applying a pressure of 65-70 psi (450-480 kPa) for 30 minutes. While still wet, the specimens were rubbed with a finger. It was found that the wet kraft paper could be removed from the polyolefin film by such rubbing, but that if the samples were left to dry, there was no visible delamination of the paper or the wood from the polyolefin.

EXAMPLE II

Using the procedure of Example I, a series of runs were carried out to determine the effects of the use of graft polyolefin and of films that had been subjected to an electric discharge or corona treatment, as well as the effect of rolling of the samples as removed from the press, film thickness, and drying on bubble formation in the panels obtained.

The substrates used measured 37.5×37.5 cm, and were OSB having one rough surface and one smoother surface. Both surfaces were subjected to the procedure of this Example.

The surfaces were overlaid with unmodified and grafted (0.0225% to 0.1125% graft) polyethylene films using the method described in Example I. The films had a thickness of approximately 25 microns (1 mil) and weighed 0.00637 pound per square foot (lb/ft$^2$)(31.2 g/m$^2$). Kraft paper weighing 0.0131 lb/ft$^2$ (64.1 g/m$^2$) was used as the outer layer. The sandwich was pressed for 1 minute on a 45×45 cm HC-80 hot press at a platen temperature of 150° C. and pressure of 200 psi (1.38 MPa) and then rolled to reduce bubble formation.

Further experimental details and the results obtained are given in Table I.

The extent of bubble formation in the panels was determined on the day after pressing. It was noted that the beneficial effects of use of grafted polyolefin and rolling were substantially more pronounced on the rough side of the OSB than on the smooth side. Bubble formation was greatest with the non-grafted polyethylene film, whether the film was electric discharge treated or not or whether the panel had been rolled or not. In general, use of film with 0.0225% to 0.0675% graft monomer resulted in the least amount of bubble formation. Rolling of the panel immediately after removal from the hot press resulted in a large reduction in bubble formation. The effect of electric discharge treatment on bubble formation was less pronounced than that of grafting or rolling, but use of treated film tended to produce fewer bubbles than with untreated film.

The effect of film thickness on bubble formation was measured using 7.5×27 cm OSB, using film thicknesses of 25, 50, 100 and 160 microns. All films were prepared from polyolefin having 0.045% of graft monomer; the films were not treated with an electric discharge. The panels were rolled immediately after removal from the press.

Bubble formation was minor in all samples, but it was noted that (i) the effect of film thickness was greater on the rough side of the boards than on the smooth side, and (ii) films of thicknesses of 50 microns or greater produced the least amount of bubbles on the rough side.

Tests showed that bubble formation was reduced substantially by drying the cellulosic substrate prior to forming the panel, from a moisture content of about 13% down to about 4% by (dry) weight. These tests were carried out using polyethylene films containing 0.045% and 0.0675% of graft monomer, having a thickness of 25 microns and which had not been electric discharge treated. Essentially no bubbles were formed, but if formed tended to occur at depressed sections of the substrate.

EXAMPLE III

Some of the 37.5×37.5 cm panels of Example II were tested to determine if bubbles could be removed. Two methods of bubble removal were used, namely: repressing and ironing. Repressing consisted of pressing the cold panel at 150° C. and 200 psi (1.38 MPa) pressure. Ironing consisted of pressing a hot flat iron directly over the bubble for varying times depending upon the severity of the defect. In both methods, the polymer film is remelted and then solidified to reform the adhesive bond with the wood and/or the paper.

It was found that repressing for 5 to 60 seconds completely eliminated the bubbles, and that ironing for 1.5 to 3 minutes eliminated virtually all the bubbles.

EXAMPLE IV

Some of the 37.5×37.5 cm panels of Example II were painted and wallpapered. The paints used were an exterior latex acrylic paint, an interior/exterior latex paint and an exterior semi-gloss alkyd enamel paint. In each instance, only a single coating of the paint was applied.

It was found that the panels were easily painted to give a good finish.

The panels were also covered with wallpaper having a water based glue applied to the wall paper as purchased. The wall paper was applied without any difficulty. In contrast, it was found that the wall paper would not adhere easily to either the OSB used to form the panels or to plywood.

EXAMPLE V

Tests were carried out to compare the bending strength and stiffness of panels with those of the uncoated substrate. The substrate was OSB measuring 0.94×12.5×27 cm, half of the substrates being used with their length parallel and the other half perpendicular to the strand orientation in the OSB. The films were formed from polyethylene grafted with 0.045% of maleic anhydride, and had not been treated with an electric discharge; film thicknesses of 25, 50, 100 and 160 microns were used. The outer layer was kraft paper.

A panel was formed on half of the width of each board using the procedure described in Example I, using a platen temperature of 150° C., pressure of 200 psi (1.38 MPa) and pressing time of 1 minute. The panel surface was rolled immediately after removal from the press. Two bending test specimens measuring 0.94×4.69×27 cm were prepared, one from the panel and the other (control) from the uncoated portion of the substrate.

Two other types of panels were also prepared. The first type were panels formed from OSB measuring 0.94×12.5×27 cm coated on both faces with sanderdust-reinforced ribbon film (10% sanderdust and polyolefin with 0.063% graft) and kraft paper. The thickness of the film was 275 microns. The second type consisted of OSB measuring 1.56×37.5×37.5 cm coated on both faces with sanderdust-reinforced film (30% sanderdust and polyolefin with 0.135% graft) and kraft paper. The thickness of the film was 525 microns. Both of the latter types of panels were tested for bending in the direction parallel to the strand orientation. All of the bending specimens were tested according to ASTM procedure D-1037 using an Instron apparatus; modulus of rupture ("MOR") and modulus of elasticity ("MOE") were calculated for each test specimen.

Further details and the results obtained are given in Table II.

From the results obtained, it appears from the tests of the effect of film thickness, the optimum thickness for improving the bending strength and stiffness of the panels is 50 microns.

The results of the bending tests on the other two types of panels are also given in Table II. It was found that use of the sanderdust-reinforced film did not significantly improve the bending strength but it did significantly improve the stiffness of the OSB.

EXAMPLE VI

Tests were carried out to determine the effects of grafting and electric discharge treatment on the peeling strengths at the wood-film and film-paper interfaces. The substrates used were 10×12.5 cm OSB, using the following films: (a) 25 micron polyethylene film, (b) 25 micron film formed from polyethylene grafted with 0.045% by weight of maleic anhydride, (c) 160 micron film formed from polyethylene with 0.045% grafted maleic anhydride, (d) the film of (c) that had been electric discharge treated, (e) 375 micron polyethylene film, (f) 375 micron film formed from polyethylene grafted with 0.045% maleic anhydride, and (g) 375 micron film formed from polyethylene grafted with 0.027% maleic anhydride and containing 10% sanderdust. Kraft paper was used as the outer layer. The substrate was coated on its smooth face using the following pressing conditions: platen temperature 150° C., pressure 200 psi (1.38 MPa) and pressing time of 1 minute. The panels were rolled immediately after removal from the press.

The samples obtained were cut into 1.25 cm wide peel test specimens. Half of the specimens were tested in the dry condition and the other half in a wet condition and, under each such condition, half of the specimens were tested for peel strength at the wood-film interface and half at the film-paper interface. The specimens for the wet test were conditioned under the vacuum-pressure cycle described in Example I. The peel tests were 180° peel tests, conducted using an Instron apparatus, at a rate of 50 cm/min; such a procedure is a modification of the procedure of ANSI/ASTM D2141. The percentage wood failure of the wood-film interface was determined in the dry condition.

It was found that the peel strength was greater than film strength for film having a thickness of 25 microns i.e. the samples failed because the film broke. Use of grafted polymer improved the wood-film peel strength by 15% in the dry condition and about 28% in the wet condition; it also improved the dry paper-film peel strength by about 97%. The unmodified polymer showed no paper-film peel strength in the wet condition, whereas the grafted polymer still showed some strength. The grafted polymer also improved the wood failure of the wood-film interface in both the dry and wet conditions, showing relatively high wood failure in the wet condition which would indicate good durability.

Electric-discharge treatment of the film resulted in a slight improvement in the dry peel strength of the wood-film interface, but not of the wet strength. There was no effect on the strength of the paper-film interface. The percentage of wood failure of the wood-film interface in both the dry and wet conditions was improved.

The sanderdust-reinforced film yielded peel strengths comparable to those of the 375 micron unreinforced film. It also gave high wood failure (80%) in the wet condition indicating good durability.

EXAMPLE VII

A test was carried out to determine the surface smoothness of the panels, compared with that of the OSB used as substrate. The substrates used were 12.5×37.5 cm, and the films used were 25 and 160 micron films formed from polyethylene containing 0.045% by weight of grafted maleic anhydride; the films had not been treated with an electric discharge. Kraft paper was used as the outer layer. The substrates were coated on both the smooth and rough surfaces of the board. The pressing conditions used were: platen temperature 150° C., pressure 200 psi and pressing time of 1 minute. The surface was rolled immediately after removal of the panel from the press. Surface roughness measurements were made at intervals of 1.25 cm using a Mitutuyo dial gauge indicator having a precision of 25 microns.

Further details and the results obtained are given in Table III.

A substantial improvement in the smoothness of the panel compared to the substrate was obtained, with deep valleys in the substrate having become shallower.

EXAMPLE VIII

A test was carried out to illustrate the manufacture of panels in a one-step manufacturing process. Commercial aspen wafers mixed with powdered phenol/formaldehyde resins were formed into 30×30 cm mats. In separate runs, mats were formed so as to provide panels with thicknesses of 0.625, 0.94 and 1.25 cm. Polyolefin film, formed from grafted (0.045%) polyethylene, and kraft paper were laid at both the bottom and top of the mat. A screen was placed underneath the bottom overlay, for support of the mat. The films having thicknesses of 25 and 160 microns were used, none of which had been electric discharge treated. Two thicknesses (75 and 150 microns) of kraft paper were used as the outer layers. The resultant assembly was pressed at a platen temperature of 200° C. and pressure of 550 psi (3.79 MPa). Pressing times were 3, 3.5 and 6 minutes for the 0.625, 0.94 and 1.25 cm panels, respectively. The pressed panels had a density of about 33 pounds per cubic foot (529 kg/m$^3$).

The panels obtained were flat, being relatively smooth on the top but with the pattern of the screen embossed on the bottom. Essentially no bubbles were formed on either side of the panels.

This example illustrates that the panels may be manufactured in a one-step process.

EXAMPLE IX

The procedure of Example I was repeated using kraft paper coated with grafted polyethylene; the coating was approximately 50 microns thick. In separate runs, the polyethylene was untreated or treated with an electric discharge. Plywood and oriented strand board substrates were used.

For untreated polymer, the results showed that the peel strength obtained was 840 g/cm on plywood and 750 g/cm on oriented strandboard, when tested dry, and 250 g/cm and 215 g/cm, respectively, when tested wet. For treated polymer, the results were 660 g/cm on plywood and 680 g/cm on oriented strandboard, when tested dry, and 250 g/cm and 230 g/cm, respectively, when tested wet. The peel strength was a measure of film strength, as it was the polymer and not the bond that failed in each instance.

TABLE I

| Graft(%) | EDT | Rld | Bubble Formation (% of Panel Face Area) | |
|---|---|---|---|---|
| | | | S | R |
| 0.0 | No | No | 0.25 | 65.00 |
| 0.0675 | No | No | 0.00 | 1.00 |
| 0.090 | No | No | 0.50 | 15.00 |
| 0.1125 | No | No | 0.00 | 30.00 |
| 0.0 | No | Yes | 0.00 | 15.00 |
| 0.0225 | No | Yes | 0.00 | 0.24 |
| 0.045 | No | Yes | 0.70 | 2.20 |
| 0.0675 | No | Yes | 0.00 | 0.08 |
| 0.090 | No | Yes | 0.00 | 0.44 |
| 0.1125 | No | Yes | 0.11 | 15.00 |
| 0.0 | Yes | Yes | 0.06 | 15.00 |
| 0.045 | Yes | Yes | 0.00 | 1.89 |
| 0.0675 | Yes | Yes | 0.00 | 0.44 |
| 0.090 | Yes | Yes | 0.23 | 0.58 |
| 0.1125 | Yes | Yes | 0.00 | 0.11 |

EDT = Electric discharge treatment
Rld = Rolled
S = Smooth Face of OSB.
R = Rough Face of OSB.

TABLE II

| Panel | | Substrate | |
|---|---|---|---|
| MOE (MPa) | MOR (MPa) | MOE (MPa) | MOR (MPa) |
| (i) Effect of Film Thickness | | | |
| A. Film Thickness - 25 microns | | | |
| (a) parallel to surface strand orientation | | | |
| 5380 | 29.0 | 5175 | 25.6 |
| (b) perpendicular to surface strand orientation | | | |
| 2370 | 19.2 | 2025 | 15.0 |
| B. Film Thickness - 50 microns | | | |
| (a) parallel to surface strand orientation | | | |
| 6080 | 37.4 | 5575 | 29.8 |
| (b) perpendicular to surface strand orientation | | | |
| 2450 | 36.8 | 2150 | 17.3 |
| C. Film Thickness - 100 microns | | | |
| (a) parallel to surface strand orientation | | | |
| 6310 | 35.4 | 6115 | 29.7 |
| (b) perpendicular to surface strand orientation | | | |
| 1780 | 17.9 | 1855 | 14.9 |
| D. Film Thickness - 160 microns | | | |
| (a) parallel to surface strand orientation | | | |
| 5725 | 34.1 | 5800 | 28.6 |
| (b) perpendicular to surface strand orientation | | | |
| 2160 | 18.5 | 1840 | 15.7 |
| (ii) Reinforced Polyethylene | | | |
| A. 10% Sanderdust in Polyethylene (7% graft) Thickness - 275 microns | | | |
| 4925 | 30.7 | 4285 | 22.8 |
| B. 30% Sanderdust in Polyethylene (15% graft) | | | |
| 4640 | 38.7 | 5215 | 41.0 |

TABLE III

| | (i) Film Thickness - 25 microns | | | |
|---|---|---|---|---|
| Distance (cm) | Smooth Side | | Rough Side | |
| | Uncoated | Coated | Uncoated | Coated |
| 2.5 | −38 | −89 | −109 | 58 |
| 3.75 | −114 | −99 | −333 | −20 |
| 5.0 | −66 | −94 | −165 | −13 |
| 6.25 | −163 | −155 | 46 | 64 |
| 7.5 | −132 | −122 | −175 | 64 |
| 8.75 | −107 | −135 | −300 | −107 |
| 10 | −58 | −36 | −127 | −8 |
| 11.25 | −107 | 8 | −122 | 10 |
| 12.5 | −61 | −53 | −277 | −33 |
| 13.75 | −86 | −71 | 64 | 269 |
| 15 | −90 | −99 | −175 | 142 |
| 16.25 | −132 | −150 | −208 | −91 |
| 17.5 | −518 | −343 | −13 | −168 |
| 18.75 | −450 | −343 | 15 | −94 |
| 20 | −394 | −292 | 46 | 0 |
| 21.25 | −236 | −201 | −114 | 20 |
| 22.5 | 25 | 13 | 0 | −38 |
| 23.75 | 0 | −20 | −282 | −74 |
| 25 | 25 | −28 | 74 | 28 |
| 2.5 | −15 | −13 | −328 | −41 |
| 3.75 | −86 | −66 | −257 | −114 |
| 5.0 | −84 | −84 | −389 | −117 |
| 6.25 | −33 | −51 | −318 | −84 |
| 7.5 | 71 | −23 | −500 | −41 |
| 8.75 | −10 | −20 | −46 | 43 |
| 10 | 28 | −58 | −203 | −38 |
| 11.25 | −5 | −102 | −74 | 84 |
| 12.5 | −102 | −135 | −478 | 0 |
| 13.75 | −13 | −168 | −508 | −94 |
| 15 | −25 | −84 | −318 | −38 |
| 16.25 | −28 | −71 | −193 | −122 |
| 17.5 | 25 | −94 | −224 | 64 |
| 18.75 | −64 | −58 | −315 | 43 |
| 20 | −135 | −66 | −215 | −3 |
| 21.25 | −250 | −140 | −386 | −56 |
| 22.5 | −178 | −175 | −439 | −91 |
| 23.75 | −236 | −241 | −500 | −94 |
| 25 | −246 | −254 | −114 | −38 |

* The measurements are on a comparative basis, showing the change in thickness from the end of the panel; the units are 2.5 × 10$^{-4}$ cm.

We claim:
1. A panel consisting essentially of:
a) a planar substantially inflexible cellulosic substrate formed from wood fragments having a rough or uneven surface; and
b) at least one layer of paper or a veneer;
c) said surface and said layer of paper or a veneer being bonded to an interposed layer in the form of a coating or film of polyolefin selected from the group consisting of (i) homopolymers of ethylene and copolymers of ethylene and at least one C$_4$-C$_{10}$ hydrocarbon alpha-olefin, and mixtures thereof, and having a melt index of less than 20 dg/min, (ii) copolymers of ethylene with at least one of vinyl acetate, acrylic acid, methacrylic acid, carbon monoxide, alkyl esters of acrylic acid and alkyl esters of methacrylic acid, and (iii) copolymers of ethylene with at least one unsaturated carboxylic acid, and mixtures of said polyolefins, said polyolefins of (i) and (ii) having been grafted with at least 9 ppm by weight of an ethylenically unsaturated carboxylic acid or anhydride, said panel having a smoother surface than said substrate.

2. The panel of claim 1 in which the polyolefin is selected from homopolymers of ethylene and copolymers of ethylene and at least one C$_4$-C$_{10}$ hydrocarbon alpha-olefin, and mixtures thereof, and having ak melt index of less than 20 dg/min.

3. The panel of claim 2 in which the polyolefin is grafted with maleic anhydride.

4. The panel of claim 2 in which the cellulosic substrate is oriented strand board.

5. The panel of claim 2 in which the layer of paper or veneer is kraft paper.

* * * * *

UNITED STATES PATENT AND TRADEMARK OFFICE
CERTIFICATE OF CORRECTION

PATENT NO. : 5,187,000
DATED : February 16, 1993
INVENTOR(S) : Suezone Chow, David H. Dawes It is certified that error appears in the above-identified patent and that said Letters Patent is hereby corrected as shown below:

On the title page, item (73): Assignee, after "Canadian Forest Products Limited Vancouver, Canada" add -- and DuPont Canada Inc., Mississauga, Ontario, Canada--

Signed and Sealed this

Fifteenth Day of March, 1994

Attest:

BRUCE LEHMAN

Attesting Officer

Commissioner of Patents and Trademarks